United States Patent [19]

Schwind

[11] Patent Number: 4,957,651

[45] Date of Patent: Sep. 18, 1990

[54] MIXTURES OF PARTIAL FATTY ACID ESTERS OF POLYHYDRIC ALCOHOLS AND SULFURIZED COMPOSITIONS, AND USE AS LUBRICANT ADDITIVES

[75] Inventor: James J. Schwind, Eastlake, Ohio

[73] Assignee: The Lubrizol Corporation, Wickliffe, Ohio

[21] Appl. No.: 144,361

[22] Filed: Jan. 15, 1988

[51] Int. Cl.$^5$ ........................................... C10M 135/02
[52] U.S. Cl. .................................... 252/56 R; 252/45; 252/48.2
[58] Field of Search ................... 252/56 R, 51.5, 49.6, 252/48.2

[56] References Cited

U.S. PATENT DOCUMENTS

| | | | |
|---|---|---|---|
| 2,203,507 | 6/1940 | Roehner et al. | 87/9 |
| 2,412,633 | 12/1946 | Schwartz | 252/33 |
| 2,527,889 | 10/1950 | Moore et al. | 44/66 |
| 2,564,423 | 8/1951 | Barnuna | 106/14 |
| 2,628,941 | 2/1953 | Adelson et al. | 252/46.7 |
| 2,672,444 | 3/1954 | Wasson et al. | 252/33.4 |
| 2,788,326 | 4/1957 | Bondi et al. | 252/56 |
| 3,112,267 | 11/1963 | Price et al. | 252/32.5 |
| 3,926,822 | 12/1975 | Habiby | 252/48.6 |
| 4,406,802 | 9/1983 | Horodysky | 252/49.6 |
| 4,478,732 | 10/1984 | Horodysky | 252/49.6 |
| 4,505,829 | 3/1985 | Wisotsky | 252/32.7 |
| 4,568,472 | 2/1986 | Horodysky | 252/49.6 |
| 4,594,171 | 6/1986 | Horodysky | 252/49.6 |
| 4,683,069 | 7/1987 | Brewster et al. | 252/32.7 E |
| 4,708,753 | 11/1987 | Forsberg | 149/2 |

FOREIGN PATENT DOCUMENTS

| | | |
|---|---|---|
| 0009701 | 4/1980 | European Pat. Off. . |
| 0092946 | 4/1983 | European Pat. Off. . |
| 2243981 | 4/1972 | Fed. Rep. of Germany ..... 252/48.2 |
| 2842138 | 4/1980 | Fed. Rep. of Germany ..... 252/48.2 |
| 2038355 | 12/1979 | United Kingdom . |
| 2038356A | 7/1980 | United Kingdom . |
| 2097813A | 11/1982 | United Kingdom . |

OTHER PUBLICATIONS

PCT International Application WO86/06371, Nov. 6, 1986.
Translation of the German Language Text for European Patent Application No. 0,009,701.

*Primary Examiner*—Olik Chaudhuri
*Assistant Examiner*—James M. Hunter, Jr.
*Attorney, Agent, or Firm*—Joseph P. Fischer; Frederick D. Hunter; Robert A. Franks

[57] ABSTRACT

Mixtures of partial fatty acid esters of polyhydric alcohols and sulfurized compositions. Compositions comprising these mixtures are useful as additives for a wide variety of lubricants.

42 Claims, No Drawings

MIXTURES OF PARTIAL FATTY ACID ESTERS OF POLYHYDRIC ALCOHOLS AND SULFURIZED COMPOSITIONS, AND USE AS LUBRICANT ADDITIVES

FIELD OF THE INVENTION

This invention relates to compositions which comprise mixtures of at least one partial fatty acid ester of a polyhydric alcohol and particular sulfurized compositions. These compositions are useful as additives for lubricating oils. Lubricating oil compositions containing such mixtures are also contemplated.

BACKGROUND OF THE INVENTION

In the past, sulfurized sperm oil was widely used as an additive in many lubricant formulations such as in gear oil, worm, and spur gears, automatic transmission fluids, metal-working lubricants and the like. Sulfurized sperm oil is especially useful for improving extreme pressure properties while providing excellent lubricity and some degree of rust-inhibition in motor oils, gear lubricants, and rolling oils. However, the sulfurized sperm oils have been replaced in recent years by other sulfurized compositions as a result of the reduction in availability of sperm oil and increased cost. Sulfurized olefins do not always exhibit the degree of lubricity which is necessary in many applications.

Habiby, in U.S. Pat. Nos. 3,926,822 and 3,953,347, describes a composition comprising a sulfurized mixture of a fatty acid ester of a mono- or polyhydric alcohol, a fatty acid and an aliphatic olefin. Newingham et al, in U.S. Pat. Nos. 3,825,495 and 4,180,466, teaches lubrication of controlled-slip differentials with a composition comprising a cosulfurized blend of a triglyceride and a monoolefin. Recchuite, in a series of U.S. Patents, for example, U.S. Pat. Nos. 4,166,796, 4,166,797, 4,321,153 and 4,456,540 teaches compositions comprising a cosulfurized mixture of triglycerides and an olefinic hydrocarbon. The '540 patent also recites the presence of a fatty acid in the reaction mixture. In U.S. Pat. No. 4,166,795, Recchuite teaches the reaction product of sulfur, lard oil, polyisobutylene oligomers and optionally another unsaturated material. All of these patents describe the use of these sulfurized mixtures in lubricants. Other sulfurized fatty acid esters are described in Lincoln et al, U.S. Pat. No. 2,113,811; Wasson et al, U.S. Pat. No. 2,672,444; Eby, U.S. Pat. No. 2,680,718; Wakim, U.S. Pat. No. 3,986,966; Zipf, U.S. Pat. No. 4,036,769; Hotten, U.S. Pat. No. 4,053,427; and Jackisch, U.S. Pat. No. 4,176,072 and in PCT Publication W086/06371.

Numerous patents describe the use of various partial esters of polyhydric alcohols as friction modifiers, emulsifiers, lubricity agents and corrosion inhibitors. These include Adams et al (U.S. Pat. No. 2,268,234), Schwartz (U.S. Pat. No. 2,412,633), Barnum (U.S. Pat. No. 2,564,423), Adelson et al (U.S. Pat. No. 2,628,941), Wasson et al (U.S. Pat. No. 2,672,444), Bondi et al (U.S. Pat. No. 2,788,326), Wisotsky (U.S. Pat. No. 4,505,829) and U.K. patent application 2,038,355.

SUMMARY OF THE INVENTION

It has now been found that lubricants comprising a partial fatty acid ester of a polyhydric alcohol and a cosulfurized mixture of 2 or more reactants selected from the group consisting of (1) at least one fatty acid ester of a polyhydric alcohol, (2) at least one fatty acid, (3) at least one olefin, and (4) at least one fatty acid ester of a monohydric alcohol, provide a synergistic benefit.

Described are compositions comprising (A) a partial fatty acid ester of a polyhydric alcohol and (B) a cosulfurized mixture of 2 or more reactants selected from the group consisting of (1) at least one fatty acid ester of a polyhydric alcohol, (2) at least one fatty acid, (3) at least one olefin, and (4) at least one fatty acid ester of a monohydric alcohol.

The compositions of this invention are useful as additives for lubricating oil compositions providing extreme pressure, antiwear, antioxidant and increased lubricity properties to the lubricating oil compositions.

Thus, it is an object of this invention to provide novel compositions. A further object is to provide useful lubricant additives. Another object is to provide lubricating oil compositions. Other objects will be apparent to those skilled in the art upon reading this disclosure or are described in detail hereinbelow.

DETAILED DESCRIPTION OF THE INVENTION

As previously described, this invention relates to compositions comprising a mixture of (A) a partial fatty acid ester of a polyhydric alcohol and (B) a cosulfurized mixture of two or more specified reactants.

Component (A), the partial fatty acid ester of a polyhydric alcohol, contains at least one hydroxyl group in the alcohol portion of the ester; that is, not all of the hydroxyl groups of the polyhydric alcohol are converted to ester groups.

Suitable partial fatty acid esters of polyhydric alcohols are known and include, for example, glycol monoesters, glycerol mono- and diesters, and pentaerythritol di- and/or triesters. Partial fatty acid esters of glycerol are preferred. Of the glycerol esters, monoesters are preferred; that is, only one of the hydroxyl groups of a glycerol moiety is converted to an ester group. Partial fatty acid esters of polyhydric alcohols can be prepared by methods well known in the art, such as direct esterification of an acid and a polyol, reaction of a fatty acid with an epoxide, etc.

While it is possible to prepare the partial esters useful as component (A) of this invention employing any of a variety of methods, they may, in a general sense, be considered as having been prepared from the reaction of a fatty acid and a polyhydric alcohol. Thus, the partial esters contain a moiety which can be considered as being derived from a fatty acid and a moiety which can be considered as being derived from a polyhydric alcohol. Suitable compositions of this invention can be prepared when component (A) is a saturated material, i.e., is essentially free of olefinic unsaturation. It is preferred that component (A) contains olefinic unsaturation. Such olefinic unsaturation usually appears in the acid moiety of the ester.

The term "fatty acid" as used in the specification and claims refers to acids which may be obtained by the hydrolysis of a naturally occurring vegetable or animal fat or oil. These acids usually contain from 8 to 22 carbon atoms and include, for example, caprylic acid, caproic acid, palmitic acid, stearic acid, oleic acid, linoleic acid, etc. Acids containing 16 to 20 carbon atoms are preferred, and those containing 16 to 18 carbon atoms are especially preferred.

As mentioned hereinabove, it is preferred that component (A) contains olefinic unsaturation, usually in the acid moiety of the ester. Suitable unsaturated acid moieties include those which can be considered as being derived from various fatty alkenoic acids, for example, octenoic acids, tetradecenoic acids and the like. Oleate esters are especially preferred.

Suitable polyhydric alcohols will have from 2 to about 12 carbon atoms, preferably from 2 to about 5 carbon atoms, and from 2 to about 8 hydroxyl groups, preferably 2 to about 4 hydroxyl groups, most preferably about 3 hydroxyl groups. Examples of suitable polyhydric alcohols include ethylene glycol, propylene glycol, trimethylene glycol, neopentylene glycol, glycerol, pentaerythritol, etc. Ethylene glycol and glycerol are preferred; glycerol is especially preferred. Polyhydric alcohols containing alkoxy groups, particularly ethoxy groups or propoxy groups, are contemplated.

The partial fatty acid esters may be present as components of a mixture containing a variety of other components. The other components may include unreacted fatty acid, fully esterified polyhydric alcohols, and other materials. From the standpoint of economics, it is preferred that the partial fatty acid ester content of such a mixture is at least about 25%, more preferably at least about 50% by weight. In a particular embodiment, the monoester constitutes at least about 30% by weight of such a mixture, more preferably at least about 45% by weight.

As mentioned hereinabove, suitable partial fatty acid esters can be prepared by methods known in the art. One method for preparing monoglycerides of fatty acids from fats and oils is described in Birnbaum, U.S. Pat. No. 2,875,221. This patent teaches a continuous process for reacting glycerol and fats to provide a product having a high proportion of monoglyceride. Furthermore, many glycerol esters are commercially available. Such esters usually contain at least about 30% by weight of the preferred monoester, generally from about 35 to about 65% by weight monoester, about 30 to about 50% by weight diester, and the balance, in the aggregate, usually is no more than about 15%, more often less than about 10% by weight of triester, free fatty acid and other components.

Another method for preparing compositions comprising partial fatty acid esters of this invention is described in the following example.

EXAMPLE 1

A mixture of glycerol oleates is prepared by reacting 882 parts of a high oleic content sunflower oil which comprises about 80% oleic, about 10% linoleic and the balance saturated triglycerides, and which contains less than 1% by weight acidity measured as oleic acid, and 499 parts glycerol in the presence of a catalyst prepared by dissolving KOH in glycerol to yield a material containing about 16.7% by weight alkoxide. The reaction is conducted by heating the mixture to 155° C. under a nitrogen sparge, then heating under nitrogen, for 13 hours at 155° C. The materials are cooled to less than 100° C., then 9.05 parts 85% $H_3PO_4$ is added to neutralize the catalyst. The neutralized reaction mixture is transferred to a 2-liter separatory funnel. The lower layer is removed and discarded. The upper layer is the product which contains, by analysis, 56.9% by weight glycerol monooleate, 33.3% glycerol dioleate (primarily 1,2—) and 9.8% glycerol trioleate.

Repeating the procedure of this example generally provides products containing from about 54–57% by weight glycerol monooleate, about 33–36% by weight of glycerol dioleate and about 8–10% by weight glycerol trioleate.

Specific examples of commercially available materials comprising partial fatty acid esters of glycerol include Emery 2421 (Emery Industries, Inc.), Cap City GMO (Capital), DUR-EM 114, DUR-EM GMO, etc. (Durkee Industrial Foods, Inc.) and various materials identified under the mark Mazol GMO (Mazer Chemicals, Inc.). Other partial fatty acid esters of polyhydric alcohols are described in K. S. Markley, Ed., "Fatty Acids", second edition, parts I and V, Interscience Publishers (1968). Numerous commercially available fatty acid esters of polyhydric alcohols are listed by tradename and manufacturer in the two volumes: McCutcheon's Functional Materials and McCutcheon's Emulsifiers and Detergents, North American and International Editions (1987).

As mentioned hereinabove, the compositions of this invention include (B), a cosulfurized mixture of 2 or more reactants selected from the group described hereinbelow.

Reactant (B) (1) is at least one fatty acid ester of a polyhydric alcohol. Reactant (B) (1) may be the same as, but is preferably different than the partial ester (A). Reactant (B) (1) may be a partial fatty acid ester, a full ester, or a mixture thereof. As in the case for Component (A), these fatty acid esters of polyhydric alcohols may be prepared in a variety of ways known in the art. In the same way as Component (A), reactant (B) (1) also may be considered as being derived from the reaction of a fatty acid with a polyhydric alcohol. The fatty acids and polyhydric alcohols from which Reactant (B) (1) may be derived are the same as those described hereinabove for Component (A). These fatty acid esters are also available from commercial sources, including several of those enumerated hereinabove for Component (A). It is preferred that reactant (B) (1) contains a major amount of the fully esterified ester. Particularly preferred is where the fully esterified ester is a triglyceride, especially wherein the acid moiety is derived from oleic acid. Especially preferred are the fatty oils, that is, naturally occurring esters of glycerol with the above-noted long chain carboxylic acids and synthetic esters of similar structure. Still more preferred are fatty oils derived from unsaturated acids, especially oleic and linoleic, including such naturally occurring animal and vegetable oils such as lard oil, peanut oil, cottonseed oil, soybean oil, corn oil, sunflower seed oil and others. Specially grown sunflowers yield an oil containing high amounts of oleic acid (e.g., greater than 80% or more by weight of oleic acid). Such sunflower oils are available commercially under the trademark TRISUN ® from SVO Enterprises Corporation.

Reactant (B) (2) is at least one fatty acid. Thus, reactant (B) (2) may be at least one fatty acid as described hereinabove. It is usually an unsaturated fatty acid such as oleic or linoleic acid, and may be a mixture of acids such as is obtained from tall oil or by the hydrolysis of peanut oil, soybean oil or the like.

Reactant (B) (3) is at least one olefin. This olefin is preferably an aliphatic olefin. That is, it is essentially free of aromatic groups such as phenyl groups, naphthyl groups and the like. The olefin usually will contain from about 4 to about 40 carbon atoms, preferably from about 8 to about 36 carbon atoms. Terminal olefins, or alpha-olefins, are preferred, especially those having from 12 to 20 carbon atoms. Olefins having internal double bonds are also useful. Mixtures of these olefins are commercially available, and such mixtures are contemplated for use in this invention.

Reactant (B) (4) is a fatty acid ester of a monohydric alcohol. Such a fatty acid ester is one which may be considered as being derived from a fatty acid as described hereinabove with an aliphatic monohydric alcohol such as methanol, ethanol, n-propanol, isopropanol, the butanols, etc. Mixtures thereof are also useful. Reactant (B) (4) can be prepared by methods well known in the art. Such fatty acid esters of monohydric alcohols are also commercially available from numerous sources.

As is apparent from the above discussion, Component (A) and the reactants employed to prepare Component (B) contain various hydrocarbon groups such as alkyl or alkenyl groups, alkylene groups, etc. These hydrocarbon groups may contain non-hydrocarbon substituents or heteroatoms, provided such non-hydrocarbon substituents or heteroatoms do not significantly detract from the essentially hydrocarbon nature of the hydrocarbon group. Suitable non-hydrocarbon substituents include, but are not limited to halo groups, such as chlorine, bromine, etc., mercapto groups, alkoxy groups, etc., and the like. Heteroatoms include, for example, sulfur, oxygen, nitrogen, and the like. Generally, there will be no more than one non-hydrocarbon group present per 10 carbon atoms in a hydrocarbon group. More preferably no more than one such substituent or heteroatom is present per 20 carbon atoms. Preferably, the hydrocarbon groups are purely hydrocarbon; that is, they contain carbon and hydrogen, and are essentially free of non-hydrocarbon substituents or heteroatoms.

As mentioned hereinabove, component (B), the cosulfurized mixture of two or more reactants selected from the group consisting of those identified as reactants (B) (1), (B) (2), (B) (3) and (B) (4), is prepared by reacting the mixture of appropriate reactants with a source of sulfur. The mixture to be sulfurized contains from about 10 to about 90 parts, more often from about 35 to about 65 parts by weight of Reactant (B) (1), or about 0.1 to about 15 parts, more often about 1 to about 5 parts by weight of Reactant (B) (2); or about 10 to about 90 parts, often from about 15 to about 60 parts, more often from about 25 to about 35 parts by weight of Reactant (B) (3), or from about 10 to about 90 parts, often from about 1 to about 50 parts, more often from about 5 to about 15 parts, by weight of reactant B(4). The mixture contains at least two members of this group of reactants. In a preferred embodiment, the mixture contains Reactant (B) (3) and at least one other member of the group of reactants identified as reactants (B) (1), (B) (2) and (B) (4).

The sulfurization reaction generally is effected at an elevated temperature, often from about 50 to about 350° C., more preferably, at a temperature of from about 100° to about 210° C. The reaction is effected with efficient agitation and often in an inert atmosphere such as nitrogen. If any of the reagents are appreciably volatile at the reaction temperature, the reaction vessel may be sealed and maintained under pressure. Although generally not necessary, the reaction may be effected in the presence of an inert solvent such as an alcohol, ether, ester, aliphatic hydrocarbon, halogenated aromatic hydrocarbon, etc., which is a liquid within the temperature range employed for the reaction.

The sulfurizing agents useful in the process of the present invention include elemental sulfur, hydrogen sulfide, sulfur halide, sodium sulfide and a mixture of hydrogen sulfide and sulfur or sulfur dioxide, etc. Preferably, the sulfurizing agent is elemental sulfur. It is frequently advantageous to add the sulfurizing agent portionwise to the mixture of the other reagents. When elemental sulfur is utilized as a sulfurizing agent, the reaction is in some instances exothermic, which can be utilized as a cost-cutting benefit since no, or at least reduced, external heating may be required. The amount of sulfur or sulfurizing agent added to the reaction mixture can be varied over a wide range although the amount included in the reaction mixture should be an amount sufficient to provide a sulfurized product containing the desired amount of sulfur.

Usually, the amount of sulfur or sulfurizing agent employed in the preparation of the sulfurized component (Component B) of this invention is calculated based on the total olefinic unsaturation of the mixture. A monoolefinic reactant, such as an alpha-olefin or oleic acid, for example, contains one mole of olefinic bonds per mole of reactant. A polyolefinic material contains 2 or more moles of olefinic bonds. For example, 1,4-hexadiene contains 2 moles of olefinic bonds. In general, from about 0.01 to about 6 moles of sulfur, present as elemental sulfur or as sulfur present in another sulfurizing reactant, may be employed per mole of olefinic bonds. More often from 0.5 to about 3 moles of sulfur are employed per mole of olefinic bonds.

Accordingly, the sulfur content of any given sulfurized composition useful in this invention depends on the amount of sulfur present in the sulfurization mixture and on the nature and amount of the reactants present in the mixture comprising reactants (B). Compositions containing from 2 to about 40 percent by weight sulfur are common and preferred are those containing from about 5 to about 25 weight percent of sulfur.

The sulfurization reaction may be conducted in the presence of various catalysts such as amines and other catalysts known to assist sulfurization reactions. A number of useful catalysts are described in U.S. Pat. No. 4,191,659 which is expressly incorporated herein by reference for relevant disclosures in this regard.

Following the sulfurization reaction, it is preferred to remove substantially all low boiling materials, typically by venting the reaction vessel, by sparging with an inert gas such as nitrogen, by vacuum distillation or stripping, etc. Insoluble by-products may be removed by filtration if necessary, usually at an elevated temperature (about 50°–120° C.).

A further optional step in the preparation of (B), the cosulfurized mixture, is treatment of the sulfurized product obtained as described above to reduce any active sulfur which may be present. An illustrative method involves contacting the sulfurized composition with an alkali metal sulfide. Other optional treatments may be employed to improve product quality such as odor, color, and staining characteristics of the sulfurized compositions.

Exemplary cosulfurized compositions meeting the requirements outlined for Component (B) are described in the patents referred to in the BACKGROUND OF THE INVENTION of this specification, particularly the Habiby, Newingham and Recchuite patents. These patents are hereby expressly incorporated herein by reference for relevant disclosures contained therein.

The following examples illustrate the preparation of other sulfurized compositions useful as Component (B) of the present invention. These examples are presented for illustrative purposes only, and are not intended to limit the scope of this invention. Unless otherwise indicated in the examples and elsewhere in the specification and claims, all parts and percentages are by weight, and temperatures are in degrees Celsius.

EXAMPLE 2

To a 2-liter, 4-necked flask equipped with a stirrer, thermowell, reflux condenser to Dean-Stark trap and a sub-surface sparge tube is charged 330 parts of a mixture of $C_{16-18}$ alpha-olefins (Ethyl Corporation) and 670 parts of a mixture comprising, by analysis, 56 percent by weight glycerol monooleate (51.5% alpha-monooleate), 40.7% glycerol dioleate and 3.3 percent by weight glycerol trioleate and which has an iodine number of 74.60. The materials are heated, with stirring, to 150° under a nitrogen sparge. The nitrogen sparge is discontinued and 117 parts sulfur are added in two increments, 15 minutes apart. The temperature is increased to 195° C. and held at 195°–199° C. for 2 hours. The nitrogen sparge is resumed and heating is continued at 195°–199° C. for 2 hours. The reaction mixture is cooled and filtered through a diatomaceous earth filter aid. The filtrate, containing 9.94% sulfur by analysis, is the product.

EXAMPLE 3

A 3-liter, 4-necked flask equipped with a stirrer, thermowell, reflux condenser to Dean-Stark trap and sub-surface gas sparge tube is charged with 2000 parts of the glycerol oleate mixture described in Example 2. The material is heated under a nitrogen sparge to 145° C. The nitrogen sparge is discontinued and 116 parts sulfur are added in two increments, 20 minutes apart. The mixture is heated to 195° C. and held at 195° C. for 2 hours. The nitrogen sparge is resumed and the reaction mixture is held for 3 additional hours at 195° C. The reaction mixture is filtered through diatomaceous earth at 75° C. The filtrate, containing 5.40% sulfur by analysis, is the product.

EXAMPLE 4

Following a procedure essentially the same as that of Example 2, 425 parts of a glycerol oleate mixture comprising about 60% glycerol monooleate (57.1% alpha-monooleate) and having an iodine number of 72.9, 75 parts of a mixture of $C_{16-18}$ alpha-olefins (Neodene TM 16-18, Shell) and 58.7 parts sulfur are reacted yielding a sulfurized product containing 9.85% sulfur by analysis.

EXAMPLE 5

A 1-liter, 4-necked flask equipped with a stirrer, thermowell, reflux condenser to Dean-Stark trap and sub-surface gas inlet tube is charged with 75 parts of the $C_{16-18}$ alpha-olefin mixture of Example 4, 50 parts oleic acid (Pamolyn 100) and 375 parts of the glycerol oleate mixture described in Example 4. The mixture is heated to 145° C., 58.7 parts sulfur are added in two increments, 15 minutes apart, and heating is continued while the temperature increases to 195° C. The reaction is continued at 195° C. for 1.5 hours followed by an additional 2 hours at 195° C. with a nitrogen sparge. The materials are filtered at 90° C. through a diatomaceous earth filter aid. The filtrate, containing 9.54% sulfur by analysis, is the product.

EXAMPLE 6

Following a procedure essentially the same as that for Example 5, 50 parts of oleic acid, 150 parts of $C_{16-18}$ alpha-olefin mixture, and 300 parts glycerol oleate mixture (each reactant as described in Examples 4 and 5 hereinabove) are reacted with 58.7 parts sulfur yielding a sulfurized material containing 10.05% sulfur by analysis.

EXAMPLE 7

A 1-liter, 4-necked flask equipped with a stirrer, thermowell, reflux condenser to Dean-Stark trap and a sub-surface gas inlet tube is charged with 45 parts soybean oil, 75 parts of a mixture of $C_{16-18}$ alpha-olefins (Neodene TM 16–18, Shell), 50 parts oleic acid (Pamolyn 100) and 330 parts of the glycerol oleate mixture described in Example 4. This mixture is heated to 145° C. under a nitrogen sparge. Nitrogen is discontinued, and 58.7 parts sulfur are added in two increments, 15 minutes apart. The materials are heated to 195° C. and held at 195° C. for 1.5 hours. A nitrogen sparge is resumed and heating is continued at 195° C. for 2 hours. The reaction mixture is filtered at 95° C. through a diatomaceous earth filter aid. The filtrate, containing 9.95% sulfur by analysis, is the product.

EXAMPLE 8

A 1-liter, 4-necked flask equipped with a stirrer, thermowell, reflux condenser to Dean-Stark trap and a sub-surface gas inlet tube is charged with 75 parts of a mixture of $C_{16-18}$ alpha-olefins (Neodene TM 16-18, Shell), 95 parts soybean oil and 330 parts of the glycerol oleate mixture described in Example 4. This mixture is heated to 145° C. under a nitrogen sparge. The nitrogen sparge is discontinued, and 58.7 parts sulfur is added in two increments, 15 minutes apart. The mixture is heated to 195° C. and held at 195° C. for 1.5 hours. The nitrogen sparge is resumed and the reaction is continued at 195° C. for 2 hours. The mixture is filtered at 90° C. through a diatomaceous earth filter aid. The filtrate, containing 9.74% sulfur by analysis, is the product.

EXAMPLE 9

Following essentially the same procedure as described in Example 8 and employing ingredients described in that example, 330 parts soybean oil, 95 parts glycerol oleate mixture and 75 parts $C_{16-18}$ alpha-olefin mixture are reacted with 58.7 parts sulfur. The resulting product contains 10.2% sulfur by analysis.

EXAMPLE 10

The glycerol oleate mixture described in Example 2 is distilled employing a thin-film evaporator at 240°-250° C. at 0.25 millimeters mercury pressure. The distillate obtained contains 95.8 percent by weight glycerol monooleate and 4.2 percent by weight glycerol dioleate by analysis. A mixture of 425 parts of this distillate, 425 parts soybean oil and 150 parts of a $C_{16-18}$ alpha-olefin mixture (Ethyl) is heated to 145° C. followed by the addition of 117 parts sulfur in three increments over 0.25 hour. The temperature is increased to 195° C. and held at 195° C. for 1.5 hours. A nitrogen sparge is begun and heating is continued for 2.5 hours at 195° C. The reaction mixture is filtered at 75° C. through a diatomaceous earth filter aid. The filtrate, containing 9.66% sulfur by analysis, is the product.

EXAMPLE 11

Following essentially the procedure of Example 10, 190 parts of the glycerol monooleate distillate described in Example 10, 660 parts soybean oil and 150 parts of $C_{16-18}$ alpha-olefin mixture (Ethyl) are reacted with 117 parts sulfur. The product obtained contains 9.84% sulfur by analysis.

EXAMPLE 12

Following essentially the procedure of Example 10, 660 parts of the glycerol oleate distillate described in Example 10, 190 parts soybean oil and 150 parts of $C_{16-18}$ alpha-olefin mixture (Ethyl) are reacted with 117 parts sulfur. The product obtained contains 9.7% sulfur by analysis.

EXAMPLE 13

A 2-liter, 4-necked flask equipped with a stirrer, thermowell, reflux condenser and sub-surface sparge tube is charged with 1000 parts soybean oil, 454 parts of a glycerol oleate mixture prepared according to the procedure of Example 1 and 53 parts oleic acid (Pamolyn 100). The materials are heated to 145° C. under a nitrogen sparge. Nitrogen sparging is discontinued, and 176 parts sulfur are added in three increments at 145° C. The mixture is heated to 195° C. and held at 195° C. for 1.5 hours. Nitrogen sparging is resumed and the reaction is continued at 195° C. for 5 hours. The materials are cooled and filtered through a diatomaceous earth filter aid. The filtrate, containing 9.34% sulfur by analysis, is the product.

EXAMPLE 14

A 2-liter, 4-necked flask equipped with a stirrer, thermowell, reflux condenser and sub-surface gas inlet tube is charged with 500 parts soybean oil, 500 parts of a glycerol oleate mixture prepared according to the procedure of Example 1, 454 parts of a $C_{16-18}$ alpha-olefin mixture (Shell) and 53 parts oleic acid (Pamolyn 100). The materials are heated to 145° C. under a nitrogen sparge. The nitrogen sparge is then discontinued and 176 parts sulfur are added in three increments over a period of 0.25 hours. The reaction mixture is heated to 195° C. and held at 195° C. for 1.5 hours. The nitrogen sparge is resumed and the reaction is continued for 3 hours at 195° C. The reaction mixture is then cooled and filtered through a diatomaceous earth filter aid. The filtrate, containing 9.71% sulfur by analysis, is the product.

EXAMPLE 15

A 2-liter, 4-necked flask equipped with a stirrer, thermowell, reflux condenser to a Dean-Stark trap and a sub-surface sparge tube is charged with 1000 parts sunflower seed oil similar to that used in Example 1, 500 parts of the glycerol oleate mixture described in Example 14 and 53 parts oleic acid (Pamolyn 100). The materials are heated to 145° C. under a nitrogen sparge, then the nitrogen sparge is discontinued. In three increments, 176 parts sulfur are added at 145° C. The materials are heated to 195° C. and held at 195° C. for 1.5 hours. The nitrogen sparge is restarted and the reaction is continued at 195° C. for 3 hours. The reaction mixture is cooled and filtered through a diatomaceous earth filter aid. The filtrate, containing 9.25% sulfur by analysis, is the product.

EXAMPLE 16

Following essentially the same procedure as employed in Example 15, 1000 parts of the glycerol oleate mixture of Example 1, 454 parts of $C_{16-18}$ alpha-olefin mixture (Shell) and 53 parts oleic acid (Pamolyn 100) are reacted with 176 parts sulfur. The product obtained contains 9.40% sulfur by analysis.

EXAMPLES 17-24

Examples 2-9 are repeated, replacing the glycerol oleate mixtures with commercial pentaerythritol dioleate described as having an acid number of less than 1.5, a hydroxyl value of 120-130 and an iodine number of 81-87.

EXAMPLE 25

A mixture of 1000 parts soybean oil, 52.4 parts tall oil fatty acid and 454 parts of a mixture of $C_{15-18}$ alpha olefin is heated to 138° C. To this mixture is added 178 parts sulfur. The mixture is heated to 146° C. whereupon an exothermic reaction takes place with the temperature rising to 193° C. The reaction is continued for 4 hours while the temperature drops to 171° C. The materials are blown with nitrogen for 2 hours at 163°-170° C., then filtered at 93° C. The sulfurized composition contains 10.3% sulfur, by analysis.

EXAMPLE 26

Following essentially the procedure of Example 25, parts soybean oil, 464 parts of $C_{15-18}$ alpha olefin and 53.8 parts of tall oil fatty acid are reacted with 247 parts sulfur.

EXAMPLE 27

Following essentially the procedure of Example 25, parts of peanut oil are reacted with 600 parts of $C_{16-18}$ alpha olefin and 175 parts of sulfur.

The following Examples illustrate compositions of this invention. All parts are parts by weight.

| Example | Composition |
|---|---|
| I | 100 parts glycerol oleate mixture (Emerest 2421) and 100 parts of the sulfurized product of Example 25 |
| II | 50 parts Emerest 2421 and 150 parts of the product of Example 7 |
| III | 100 parts of the glycerol monooleate containing product of Example 1 and 150 parts of the product of Example 25 |
| IV | 50 parts of commercial pentaerythritol dioleate described in Examples 17-24 and 150 parts of the product of Example 25 |

The compositions of this invention are useful as oil-soluble lubricant additives providing friction modification, anti-wear and extreme pressure performance. They also impart energy conserving properties to lubricants containing them. Thus, they are useful in automotive lubricants, such as engine oils and drivetrain lubricants, which are intended for use when it is desired to reduce fuel consumption. These energy conserving properties are also useful in industrial applications when it is desired to reduce the power requirements, such as electrical power requirements, and consequently the cost, of operating industrial machinery. Depending on the particular nature of the individual components comprising the compositions, additional benefits such as anti-oxidancy, corrosion inhibition, and the like may be obtained. The compositions of this invention have been shown to improve wear and extreme pressure properties of manual transmission fluids without sacrificing friction modification. The lubricating oil compositions of this invention comprise a major amount of an oil of lubricating viscosity and a minor amount of the compositions of this invention. By a major amount is meant more than 50%. Thus, 51%, 80% and 99% are major amounts. A minor amount is less than 50%. Examples of minor amounts are 1%, 25% and 49%. Amounts of the composition of this invention used as additives for lubricating compositions of this invention will, of course, depend in part on whether the composition contains a diluent and on other characteristics of the composition. The compositions of this invention are used in an effective amount to provide the above-described properties. Typically, the compositions of this invention are employed in an oil of lubricating viscosity in amounts, on a neat chemical basis, ranging from about 0.1 to about 20% by weight of the composition in the lubricating oil composition. More often, the composition is used at about 0.25 to about 10%, preferably from about 0.5 to about 5% by weight of the lubricating oil composition.

The lubricating oil compositions may be prepared by dissolving or suspending the compositions of this invention, and any other additives which may be desired, directly into the base oil. More often, the composition of this invention is a component of an additive concentrate which may contain other additives and which often contains an inert organic diluent. Such additive concentrates usually comprise from about 1 to about 90% by weight of the compositions of this invention. Alternatively, Components (A) and (B) may be added individually, with or without other additives, as desired, to an oil of lubricating viscosity in order to prepare lubricating composition of this invention.

Component (A) and Component (B) may be incorporated over a wide range of proportions into the compositions of this invention. Preferably, the compositions of this invention contain Component (A) and Component (B) in weight ratios of (A) to (B) ranging from about 0.05 to 10 to about 5 to 0.1, more preferably from about 0.25 to 2 to about 2 to 0.25.

Component (A) is generally present in the lubricating oil compositions of this invention in amount ranging from about 0.0005 to about 20 percent by weight, preferably from about 0.25 to about 10, more preferably from about 0.5 to about 2 percent by weight. Component (B) is generally present in amounts ranging from about 0.01 to about 20 percent by weight, preferably from about 0.1 to about 5, more preferably from about 0.25 to about 2 percent by weight. Often, Component (A) constitutes from about 10 to about 90% by weight of the compositions of this invention. Accordingly, Component (B) often constitutes from about 90 to about 10% by weight of the composition. Frequently, Component (A) and Component (B) are used in approximately equal weight proportions.

The lubricating compositions of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used.

Another suitable class of synthetic lubricating oils that can be used comprises the esters of dicarboxylic acids and those made from $C_5$ to $C_{12}$ monocarboxylic acids and polyols and polyol ethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxysiloxane oils and silicate oils.

Unrefined, refined and rerefined oils, either natural or synthetic (as well as mixtures of two or more of any of these) of the type disclosed hereinabove can be used in the lubricating compositions of the present invention. Unrefined oils are those obtained directly from a natural or synthetic source without further purification treatment. Refined oils are similar to the unrefined oils except they have been treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication No. 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, the compositions, additive concentrates and lubricating compositions of this invention may contain other additives. The use of such additives is optional, and the presence thereof in the compositions, additive concentrates and lubricating compositions of this invention will depend on the particular use and level of performance required. One optional additive is a zinc salt of a dithiophosphoric acid. Zinc salts of dithiophosphoric acids are often referred to as zinc dithiophosphates, zinc 0,0-dihydrocarbyl dithiophosphates, and by other commonly used names. They are sometimes referred to by the abbreviation ZDP. One or more zinc salts of dithiophosphoric acids may be present in a minor amount to provide additional extreme pressure, anti-wear and anti-oxidancy properties.

In addition to zinc salts of dithiophosphoric acids discussed hereinabove, other additives that may optionally be used in the compositions, additive concentrates and lubricating compositions of this invention include, for example, detergents, dispersants, viscosity improvers, oxidation inhibiting agents, pour point depressing agents, extreme pressure agents, anti-wear agents, color stabilizers and anti-foam agents.

Auxiliary extreme pressure agents and corrosion and oxidation inhibiting agents are exemplified by chlorinated aliphatic hydrocarbons, organic sulfides and polysulfides, phosphorus esters including dihydrocarbon and trihydrocarbon phosphites, molybdenum compounds, and the like.

Viscosity improvers (also sometimes referred to as viscosity index improvers) are usually polymers, including polyisobutenes, polymethacrylic acid esters, diene polymers, polyalkyl styrenes, alkenylarene-conjugated diene copolymers and polyolefins. Multifunctional viscosity improvers which also have dispersant and/or antioxidancy properties are known and may optionally be used.

Pour point depressants are a particularly useful type of additive. See for example, page 8 of "Lubricant Additives" by C. V. Smalheer and R. Kennedy Smith (Lezius-Hiles Company Publishers, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125-162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a non-volatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent No. 1,306,529 and in many U.S. Patents including the following:

| | | |
|---|---|---|
| 3,163,603 | 3,381,022 | 3,542,680 |
| 3,184,474 | 3,399,141 | 3,567,637 |

-continued

| | | |
|---|---|---|
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. Patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. Patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. Patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight. In most instances, they each present at from about 0.1% to about 10% by weight.

The various additives and compositions described herein can be added directly to the lubricating oil. Preferably, however, they are diluted with a substantially inert, normally liquid organic diluent such as mineral oil, naphtha, benzene, toluene or xylene, to form an additive concentrate. These additive concentrates usually comprise about 1 to about 90% by weight of the compositions of this invention and may contain, in addition, one or more other additives known in the art or described hereinabove. Chemical concentrations such as 15%, 20%, 30% or 50% or higher may be employed.

The lubricating compositions of this invention find utility in many areas. Examples include, but are not limited to, lubricants for internal combustion engines, especially fuel economy improving oils, power transmission fluids such as automatic transmission fluids, hydraulic fluids, power shift oils and tractor oils. Tractor oils frequently serve multiple purposes such as hydraulic fluids, wet brake lubricants, engine lubricants, etc., all employing a lubricant from a common sump. Other areas of application include industrial applications such as metal-working fluids and industrial gear oils. The compositions of this invention also find utility in various aqueous systems such as are described by Forsberg in U.S. Pat. Nos. 4,329,429, 4,368,133, 4,448,703, and in other aqueous compositions.

Typical additive concentrates and lubricating oil compositions of this invention are illustrated by the following Examples. The lubricating compositions are prepared by combining the specified ingredients, individually or from concentrates, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. These examples are presented for illustrative purposes only, and are not intended to limit the scope of this invention.

TABLE I

Lubricating Oil Compositions

| Example | Parts by Weight | | | | |
|---|---|---|---|---|---|
| | A | B | C | D | E |
| Lubricant type: Mineral oil basestock | Gear | Gear | Farm Tractor | Farm Tractor | Farm Tractor |
| SAE 80W (Texaco) | Balance | | | | |
| SAE 80W (SIPCO) | | Balance | | | |
| Sun Tulsa J20B (Sun Oil) | | | Balance | Balance | Balance |
| Ingredient | | | | | |
| Alkylated benzene | 15 | | | | |
| Acrylate polymer viscosity improver (Texaco TC 10124) | 10 | | | | |
| Amine treated styrene-alkyl maleate copolymer | 0.4 | 0.4 | 2.03 | 2.03 | 2.03 |
| Silicone Antifoam (Mixture with hydrocarbon solvent) | 0.02 | 0.01 | 0.02 | 0.02 | 0.02 |
| Zinc salt of mixed alkyl carboxylic acid-dialkyl phosphorodithioate | 2.12 | 2.12 | 2.12 | 2.12 | 1.87 |
| Reaction product of N,N-dialkylalkanol amine with polyisobutenyl succinic anhydride | 0.31 | 0.31 | 0.31 | 0.31 | 0.30 |
| Basic calcium sulfonate | 1.43 | 1.43 | 1.43 | 1.43 | 1.72 |
| Basic borated alkali metal sulfonate | 0.75 | 0.75 | | 0.38 | 0.75 |
| Product of Example 25 | 0.50 | 0.50 | 0.50 | 0.50 | 0.50 |
| Fatty oil containing 65% glycerol monooleate (Emerest 2421) | 0.50 | 0.50 | 0.50 | 0.50 | 0.50 |

TABLE II

Lubricating Oil Compositions

| Example | Parts by Weight | |
|---|---|---|
| | F | G |
| Lubricant type: Mineral oil basestock | ATF | ATF |
| 100 Neutral Oil (CitCon) | Balance | Balance |
| Ingredient | | |
| Alkylated benzene | 5.0 | 5.0 |
| Amine treated stryene-alkyl maleate copolymer | 1.98 | 1.98 |
| Silicone Antiform | 0.042 | 0.042 |
| Product of Example 25 | 0.50 | 0.50 |
| Fatty oil containing 65% glycerol monooleate (Emerest 2421) | 0.70 | 0.3 |
| | 0.70 | 0.3 |
| $CS_2$ post-treated polyisobutenyl succinic anhydride-ethylene polyamine reaction product | 1.45 | 1.16 |
| Borated polyisobutenyl succinic anhydride-ethylene polyamine reaction product | 0.34 | 0.67 |
| Sodium petroleum sulfonate | 0.54 | 0.54 |
| Alkylated diphenylamine | 0.08 | 0.08 |
| Alkyl thio alkanol | 0.5 | 0.5 |
| Dibutyl phosphite | 0.11 | 0.11 |
| Zinc salt of di (sec-alkyl) dithiophosphate | 0.06 | 0.06 |
| Ethoxylated fatty amine | 0.1 | |
| Alkylated naphthalene | 0.2 | 0.2 |
| Mercaptobenzothiazole | 0.025 | 0.025 |
| Di-fatty alkylphosphite | | 0.3 |

TABLE III

Additive Concentrates

| Example: | H | I | J | K | L |
|---|---|---|---|---|---|
| Ingredient | | | | | |
| Diluent Oil | Balance | Balance | Balance | Balance | Balance |
| Zinc salt of alkyl carboxylic acid-dialkyl phosphorodithioate mixture | 27.51 | | 31.61 | 29.42 | 23.36 |
| Fatty oil containing 65% glycerol monoleate (Emerest 2421) | 6.49 | 1.82 | 7.46 | 6.94 | 6.25 |
| Product of Example 25, | 6.49 | 3.03 | 7.46 | 6.94 | 6.25 |
| Reaction product of N,N-dialkyl alkanolamine with polyisobutenyl succinic anhydride | 4.03 | | 4.63 | 4.31 | 3.75 |
| Basic calcium sulfonate | 18.57 | | 21.35 | 19.86 | 21.45 |
| Borated basic alkali metal sulfonate | 9.74 | | | 5.21 | 9.38 |
| CS$_2$ post-treated polyisobutenyl succinic anhydride-ethylene polyamine reaction product | | 7.03 | | | |
| Borated polyisobutenyl anhydride-ethylene polyamine reaction product | | 4.06 | | | |
| Sodium petroleum sulfonate | | 3.27 | | | |
| Alkylated diphenyl amine | | 0.51 | | | |
| Alkylthio alkanol | | 3.03 | | | |
| Dibutyl phosphite | | 0.67 | | | |
| Zinc salt of di(secondary alkyl) dithiophosphate | | 0.38 | | | |
| Ethoxylated fatty amine | | | | | |
| Alkylated naphthalene | | 1.21 | | | |
| Di-fatty alkyl phosphite | | 1.82 | | | |
| Alkylated benzene | | 30.30 | | | |
| Amine-treated styrene-maleate copolymer | | 11.9 | | | |

As noted hereinabove, lubricating compositions comprising Components (A) and (B) display unexpectedly enhanced performance compared to lubricating compositions comprising either Component (A) or Component (B) individually.

The unexpected benefits provided by the compositions of this invention are illustrated by the test results presented below. The Timken test is a well-known procedure used to determine the load-carrying ability of a lubricant. It is described in the American Society for Testing and Material procedure ASTM D-2782-77.

Gear lubricants are prepared from an SAE 80W basestock (Texaco) to which is added 15% of an alkylated benzene, 10% of an acrylate polymer viscosity improver (Texaco TC10124), 0.4% of an amine treated styrene-alkyl maleate copolymer, 100 ppm of a silicone antifoam and an additive concentrate contributing a mineral oil diluent, 2.12% of a zinc salt of an alkyl carboxylic acid-dialkyl phosphorodithioate mixture, 0.31% of the reaction product of a N,N-dialkyl alkanolamine with polyisobutenyl succinic anhydride, 1.43% of basic calcium sulfonate, 0.75% of basic borated alkali metal sulfonate, and the additives listed below:

| Example | Additive | Timken (ASTM-2782) OK Load | PSI |
|---|---|---|---|
| M | 1% of product of Example 25 | 55 lb.<br>60 lb. | 32,850 psi<br>35,825 psi |
| N | 1% of commercial glycerol monoleate (Emerest 2421-Emery) + additional 0.52% basic calcium sulfonate | 13 lb.<br>13 lb. | 8,775 psi<br>8,250 psi |

| Example | Additive | Timken (ASTM-2782) OK Load | PSI |
|---|---|---|---|
| A | 0.50% of product of Example 25, + 0.50% of Emerest 2421 | 65 lb.<br>65 lb. | 34,725 psi<br>34,725 psi |

The instant invention is shown and described herein in what is considered to be the most practical, and the preferred embodiments. It is recognized, however, that departures may be made therefrom which are within the scope of the invention, and that obvious modifications will occur to one skilled in the art upon reading this disclosure.

What is claimed is:

1. A composition comprising:
   (A) a partial fatty acid ester of a polyhydric alcohol and
   (B) a cosulfurized mixture of 2 or more reactants selected from the group consisting of
      (1) at least one fatty acid ester of a polyhydric alcohol,
      (2) at least one fatty acid,
      (3) at least one olefin, and
      (4) at least one fatty acid ester of a monohydric alcohol.

2. The composition of claim 1 wherein component (A) comprises a component of a fatty oil.

3. The composition of claim 1 wherein component (A) comprises a fatty acid ester of glycerol.

4. The composition of claim 1 wherein component (A) is present as a component of a fatty oil, said oil containing at least about 25% by weight of a partial fatty acid ester of a polyhydric alcohol.

5. The composition of claim 3 wherein component (B) comprises glycerol monooleate.

6. The composition of claim 3 wherein component (A) comprises a mixture of glycerol monooleate, glycerol dioleate and glycerol trioleate.

7. The composition of claim 1 wherein reactant (B) (1) is present as a component of a fatty oil, said oil containing at least 50% by weight of a full fatty acid ester of a polyhydric alcohol.

8. The composition of claim 1 wherein reactant (B) (3) is at least one aliphatic olefin containing from about 4 to about 40 carbon atoms.

9. The composition of claim 1 wherein reactant (B) (2) comprises oleic acid.

10. The composition of claim 1 wherein reactant (B) (4) comprises methyl oleate.

11. The composition of claim 1 wherein component (B) is prepared from reactants including (B) (3), at least one olefin.

12. The composition of claim 11 wherein component (A) comprises glycerol monooleate.

13. The composition of claim 11 wherein component (A) comprises a mixture of glycerol monooleate, glycerol dioleate and glycerol trioleate.

14. The composition of claim 1 wherein the weight ratio of component (A) to component (B) is between about 0.05 to 10 and about 5 to 0.1.

15. The composition of claim 14 wherein component (B) comprises a cosulfurized mixture comprising
  (1) from about 10 to about 90 parts by weight of at least one fatty acid ester of a polyhydric alcohol, and
  (2) from about 0.1 to about 15 parts by weight of at least one fatty acid.

16. The composition of claim 14 wherein component (B) comprises a cosulfurized mixture comprising
  (1) from about 10 to about 90 parts by weight of at least one fatty acid ester of a polyhydric alcohol, and
  (4) from about 10 to about 90 parts by weight of at least one fatty acid ester of a monohydric alcohol.

17. The composition of claim 14 wherein component (B) comprises a cosulfurized mixture comprising
  (1) from about 10 to about 90 parts by weight of at least one fatty acid ester of a polyhydric alcohol, and
  (3) from about 15 to about 60 parts by weight of at least one olefin.

18. The composition of claim 14 wherein component (B) comprises a cosulfurized mixture comprising
  (2) from about 1 to about 5 parts by weight of at least one fatty acid.
  (3) from about 15 to about 60 parts by weight of at least one olefin.

19. The composition of claim 14 wherein component (B) comprises a cosulfurized mixture comprising
  (3) from about 10 to about 60 parts by weight of at least one olefin, and
  (4) from about 10 to about 90 parts by weight of at least one fatty acid ester of a monohydric alcohol.

20. The composition of claim 14 wherein component (B) comprises a cosulfurized mixture comprising
  (1) from about 35 to about 65 parts by weight of at least one fatty acid ester of a polyhydric alcohol,
  (2) from about 1 to about 5 parts by weight of at least one fatty acid, and
  (3) from about 15 to about 60 parts by weight of at least one olefin.

21. The composition of claim 14 wherein component (B) comprises a cosulfurized mixture comprising
  (1) from about 35 to about 65 parts by weight of at least one fatty acid ester of a polyhydric alcohol,
  (3) from about 15 to about 60 parts by weight of at least one olefin, and
  (4) from about 10 to about 90 parts by weight of at least one fatty acid ester of a monohydric alcohol.

22. The composition of claim 20 wherein the mixture further comprises
  (4) from about 10 to about 90 parts by weight of at least one fatty acid ester of a monohydric alcohol.

23. The composition of claim 15 wherein the mixture further comprises
  (4) from about 10 to about 90 parts by weight of at least one fatty acid ester of a monohydric alcohol.

24. The composition of claim 18 wherein the mixture further comprises
  (4) from about 10 to about 90 parts by weight of at least one fatty acid ester of a monohydric alcohol.

25. A composition comprising
  (A) from 10 to 90 percent by weight of a partial fatty acid ester of a polyhydric alcohol and
  (B) from 90 to 10 percent by weight of a sulfurized composition prepared by reacting at 100°-210° C. a sulfurizing agent comprising elemental sulfur with a mixture of 2 or more reactants selected from the group consisting of
  (1) at least one fatty acid ester of a polyhydric alcohol,
  (2) at least one fatty acid,
  (3) at least one olefin, and
  (4) at least one fatty acid ester of a monohydric alcohol.

26. The composition according to claim 25 wherein component (A) comprises a fatty acid ester of glycerol.

27. The composition of claim 26 wherein component (A) comprises glycerol monooleate.

28. The composition of claim 26 wherein component (A) comprises a mixture of glycerol monooleate, glycerol dioleate and glycerol trioleate.

29. The composition according to claim 25 wherein reactant (B) (1) comprises a major amount of a fully esterified fatty acid ester of a polyhydric alcohol.

30. The composition according to claim 25 wherein reactant (B) (3) is at least one aliphatic olefin containing from about 4 to about 40 carbon atoms.

31. The composition according to claim 26 wherein reactant (B) (2) comprises oleic acid.

32. The composition according to claim 25 wherein reactant (B) (4) comprises methyl oleate.

33. A composition comprising:
  (A) a partial fatty acid ester of a polyhydric alcohol and
  (B) a cosulfurized mixture prepared by reacting at an elevated temperature, a sulfurizing agent with two or more members of the group consisting of
  (1) at least one fatty acid ester of a polyhydric alcohol,
  (2) at least one fatty acid,
  (3) at least one olefin, and
  (4) at least one fatty acid ester of a monohydric alcohol.

34. The composition of claim 33 wherein the sulfurizing agent comprises sulfur.

35. The composition of claim 34 wherein the sulfurizing agent further comprises hydrogen sulfide.

36. An additive concentrate for use in preparing lubricating compositions, comprising a substantially inert normally liquid organic diluent and about 1 to about 90 percent by weight of a composition comprising:
 (A) a partial fatty acid ester of a polyhydric alcohol and
 (B) a cosulfurized mixture of 2 or more reactants selected from the group consisting of
  (1) at least one fatty acid ester of a polyhydric alcohol,
  (2) at least one fatty acid,
  (3) at least one olefin, and
  (4) at least one fatty acid ester of a monohydric alcohol.

37. A lubricating composition comprising a major amount of an oil of lubricating viscosity and a minor amount of the additive concentrate of claim 36.

38. An additive concentrate for use in preparing lubricating compositions, comprising a substantially inert, normally liquid organic diluent and about 1 to about 90 percent by weight of a composition comprising:
 (A) from 10 to 90 percent by weight of a partial fatty acid ester of a polyhydric alcohol and
 (B) from 90 to 10 percent by weight of a sulfurized composition prepared by reacting at 100°–210° C. a sulfurizing agent comprising elemental sulfur with a mixture of 2 or more reactants selected from the group consisting of
  (1) at least one fatty acid ester of a polyhydric alcohol,
  (2) at least one fatty acid,
  (3) at least one olefin, and
  (4) at least one fatty acid ester of a monohydric alcohol.

39. An additive concentrate for use in preparing lubricating compositions, comprising a substantially inert, normally liquid organic diluent and about 1 to about 90 percent by weight of a composition comprising:
 (A) a partial fatty acid ester of a polyhydric alcohol and
 (B) a cosulfurized mixture prepared by reacting at an elevated temperature, a sulfurizing agent with two or more members of the group consisting of
  (1) at least one fatty acid ester of a polyhydric alcohol,
  (2) at least one fatty acid,
  (3) at least one olefin, and
  (4) at least one fatty acid ester of a monohydric alcohol.

40. A lubricating composition comprising a major amount of an oil of lubricating viscosity and a minor amount of a composition comprising:
 (A) a partial fatty acid ester of a polyhydric alcohol and
 (B) a cosulfurized mixture of 2 or more reactants selected from the group consisting of
  (1) at least one fatty acid ester of a polyhydric alcohol,
  (2) at least one fatty acid,
  (3) at least one olefin, and
  (4) at least one fatty acid ester of a monohydric alcohol.

41. A lubricating composition comprising a major amount of an oil of lubricating viscosity and a minor amount of a composition comprising:
 (A) from 10 to 90 percent by weight of a partial fatty acid ester of a polyhydric alcohol and
 (B) from 90 to 10 percent by weight of a sulfurized composition prepared by reacting at 100°–210° C. a sulfurizing agent comprising elemental sulfur with a mixture of 2 or more reactants selected from the group consisting of
  (1) at least one fatty acid ester of a polyhydric alcohol,
  (2) at least one fatty acid,
  (3) at least one olefin, and
  (4) at least one fatty acid ester of a monohydric alcohol.

42. A lubricating composition comprising a major amount of an oil of lubricating viscosity and a minor amount of a composition comprising:
 (A) a partial fatty acid ester of a polyhydric alcohol and
 (B) a cosulfurized mixture prepared by reacting at an elevated temperature, a sulfurizing agent with two or more members of the group consisting of
  (1) at least one fatty acid ester of a polyhydric alcohol,
  (2) at least one fatty acid,
  (3) at least one olefin, and
  (4) at least one fatty acid ester of a monohydric alcohol.

* * * * *